United States Patent [19]

Uchida et al.

[11] 3,742,372

[45] June 26, 1973

[54] AUTOMATIC SYNCHRONIZING SYSTEM WITH REPETITIVE SEARCH AND RAPID ACQUISITION

[75] Inventors: Kozo Uchida; Naohisa Nakaya; Koji Suzuki, all of Tokyo, Japan

[73] Assignee: Iwatsu Electric Company Limited, Tokyo, Japan

[22] Filed: Aug. 20, 1969

[21] Appl. No.: 851,588

[30] Foreign Application Priority Data

Aug. 23, 1968 Japan .............................. 43/59920

[52] U.S. Cl. .................. 328/63, 178/69.5, 307/269, 328/127, 328/151, 328/155

[51] Int. Cl. ............................................ H03k 1/00

[58] Field of Search ........................ 307/269; 315/18, 315/19; 328/63, 72, 151, 155, 127; 178/69.5

[56] References Cited

UNITED STATES PATENTS 3,244,989 4/1966 Carlson .......................... 328/151 X

*Primary Examiner*—Stanley D. Miller, Jr.

*Attorney*—Chittick, Pfund, Birch, Samuels and Gauthier

[57] ABSTRACT

In a system for deriving a synchronizing output signal by sampling the input signal with the derived output signal, a control signal is derived in response to the sampled asynchronous condition of the input and output signals for adjusting the frequency of the output signal to achieve the synchronous condition. The frequency adjustment progresses over a predetermined range and is reset when it reaches the end of the range. The adjustment is advanced by a time derivative signal derived from the asynchronous condition and is arrested by the time derivative being minimum which corresponds to the synchronous condition.

4 Claims, 9 Drawing Figures

INVENTORS
KOZO UCHIDA
NAOHISA NAKAYA
KOJI SUZUKI

BY Chittick, Pfund, Birch
Samuels + Gauthier
ATTORNEY

INVENTORS
KOZO UCHIDA
NAOHISA NAKAYA
KOJI SUZUKI

BY Chittick, Pfund, Birch Samuels & Gauthier
ATTORNEY

INVENTORS
KOZO UCHIDA
NAOHISA NAKAYA
KOJI SUZUKI

BY Chittick, Pfund, Birch
Samuels & Gauthier ATTORNEY

AUTOMATIC SYNCHRONIZING SYSTEM WITH REPETITIVE SEARCH AND RAPID ACQUISITION

CROSS-REFERENCE TO RELATED APPLICATIONS

This application is related to applications Ser. No. 851,589 , filed Aug. 20, 1969, entitled AUTOMATIC SYNCHRONIZING SYSTEM and Ser. No. 851,609 , dated Aug. 20, 1969, entitled AUTOMATIC SYNCHRONIZING SYSTEMS FOR SAMPLING DEVICES now U.S. Pat. No. 3,633,066, filed on even date herewith.

BACKGROUND OF THE INVENTION

This invention relates to an automatic synchronizing system adapted to stably and automatically sample an output pulse which is synchronized with a synchronizing signal input in apparatus requiring a synchronizing signal such as oscilloscopes, pulse generators and the like or a sampling device such as sampling oscilloscopes and the like. As is well known in the art, a synchronizing circuit of an apparatus requiring a synchronizing signal operates to convert a received synchronizing signal input having a frequency of more than a predetermined frequency into a pulse synchronized with said signal and having a lower frequency less than said predetermined frequency but the synchronizing circuit does not effect frequency conversion when it receives a synchronizing signal input having a frequency less than said predetermined frequency. The synchronizing signal may include a number of variables such as its frequency, amplitude waveform and the like so that in order to provide an output pulse synchronized with such a synchronizing signal input, the synchronizing circuit must be constructed to establish synchronism by manually varying the synchronizing level of the signal input or by manually varying the self excitation frequency of a synchronizing circuit which is set into self exciting condition. In other words, the synchronizing circuit is manually adjusted while observing a waveform displayed by a waveform observing device such as an oscilloscope to vary varible factors such as the voltage or current in the synchronizing circuit thus establishing synchronism. Such an manual adjustment, however, is not only troublesome, but also requires fine adjustment as the frequency of the synchronizing signal input increases.

SUMMARY OF THE INVENTION

It is therefore an object of this invention to provide a novel automatic synchronizing circuit free from the disadvantages mentioned above.

According to one aspect of this invention, in a synchronizing system comprising a synchronizing circuit for sampling a synchronizing input signal or a signal synchronized with the input signal to send out a waveform maintained in the circuit and a synchronism control circuit for controlling the synchronizing circuit, said synchronism circuit including means to differentiate said sampled and maintained waveform and means to stop variation of a variable element in the synchronizing circuit when the amplitude of the differentiated waveform becomes minimum, there is provided an amplifier to amplify the differentiated waveform and means to vary the amplification factor of the amplifier in inverse proportion to the value of the differentiated waveform whereby to rapidly reach a point of synchronism.

According to another aspect of this invention the amplifier is replaced by an attenuator and the degree of attenuation of the attenuator is varied in proportion to the value of the differentiated waveform.

BRIEF DESCRIPTION OF THE DRAWING

In the accompanying drawing :

FIG. 3' is a partial view of the system of FIG. 3 showing a modification.

DESCRIPTION OF PREFERRED EMBODIMENT

Figure 1A:
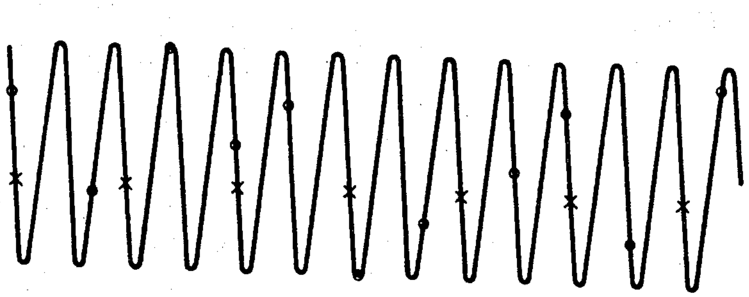
FIGS. 1*a* and 1*b* show waveforms of a synchronizing signal input.
Figure 1B:
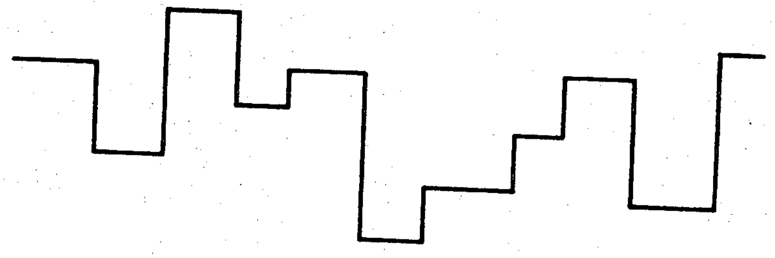

Referring now to the accompanying drawing, FIGS.1*a* and 1*b* show waveforms helpful to explain the principle of this invention. FIG.1*a* shows a synchronizing signal input of the sine wave form to be supplied to a synchronizing circuit to operate the same. A portion of the input is sampled by an asynchronous pulse to derive an amplitude component output. When the derived amplitude component is maintained until sampling in the succeeding stage is effected, a stepped waveform as shown in FIG.1*b* can be obtained. Small circles in FIG.1*a* show points of sampling by the asynchronous pulse before synchronization is achieved whereas points indicated by X represent points of sampling by a synchronous pulse as provided when synchronism is achieved. Thus, the waveform sampled and maintained by the synchronous pulse always has a definite value and its time derivative will be zero.

Figure 2:
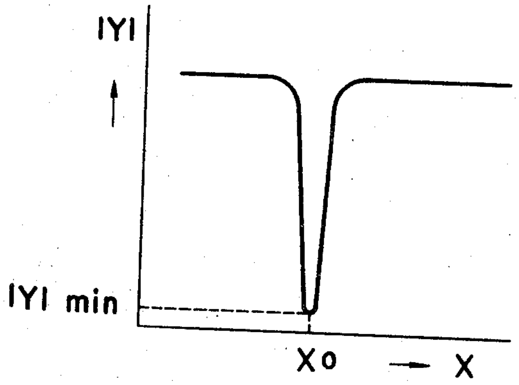
FIG.2 is a plot to explain the principle of an automatic synchronizing system.

It is now assumed that $V(t)$ represents a sampled and maintained waveform and that $Y$ represents a differential of $V(t)$ with respect to time, then we obtain $$Y = dV(t)/dt$$

and the absolute value of $Y$, $|Y|$, assumes the minimum value when synchronism is established. When a variable element in the synchronizing circuit is made variable from its lower limit to its upper limit or over the entire range, $|Y|$ manifests the minimum value at one or several points. Although FIG.2 shows a characteristic curve wherein $|Y|$ manifests the minimum value at a single point, other cases involving a plurality of synchronizing points can be similarly treated. In FIG.2, the abscissa X represents the variable element in the synchronizing circuit and the value of X corresponding to the minimum value of $|Y|$ is denoted by Xo. When the value of X is varied to obtain a value of $|Y|$ which is equal to or close to the minimum value of $|Y|$, or $|Y|$ 09 min, and when the value of X is fixed to that particular value, then this value will be very close to Xo. In this manner, X is varied to obtain a value which is equal to or very close to $|Y|$min, and the value of X is fixed at that point. At this time, when conditions such as the amplitude or frequency of the input signal vary to cause loss of synchronization, X is again varied until a value of | Y | is obtained which is equal or very close to | Y| 09min and the value of X is fixed to this point. It is, therefore, a feature of this invention to automatically fix the value of X to a value equal or close to the value Xo corresponding to | Y|min.

Figures 3, 4:
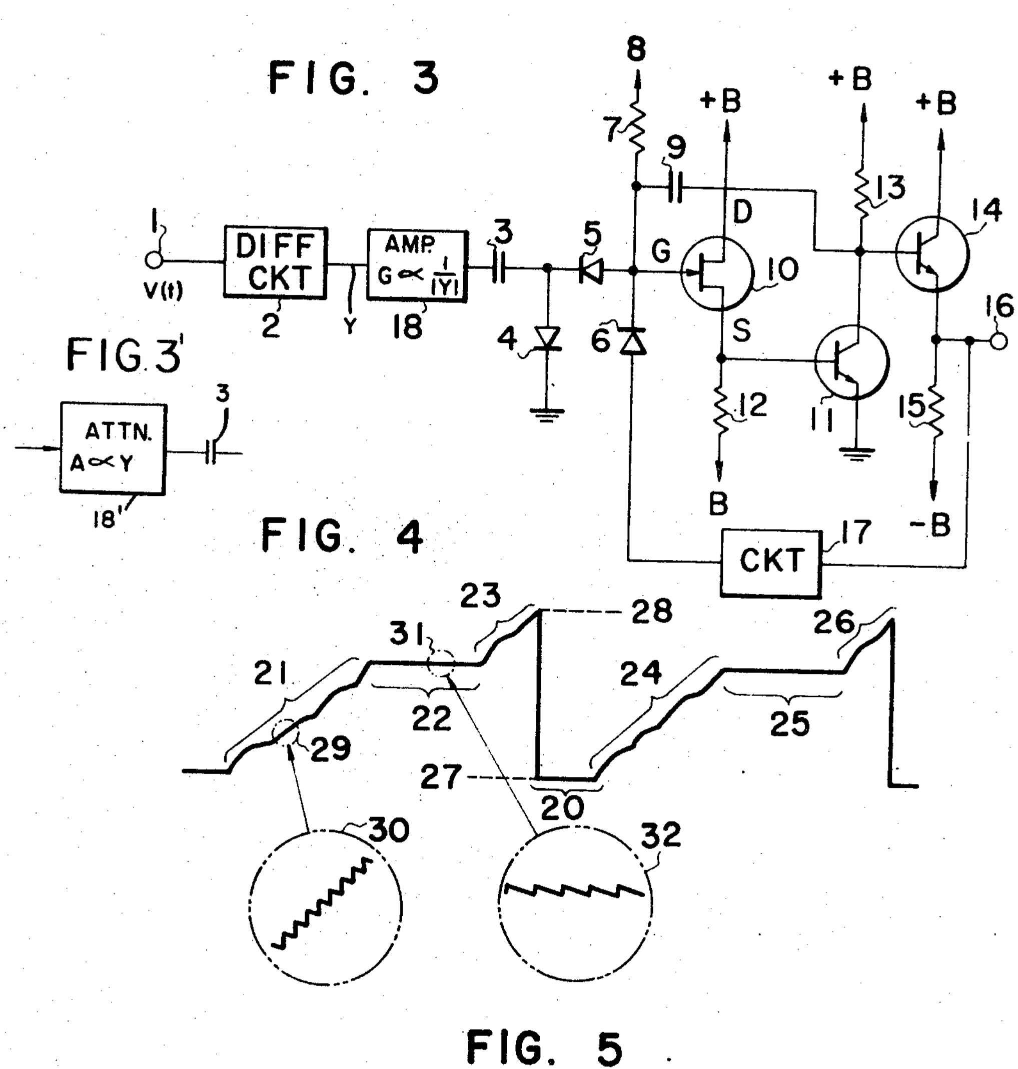
FIG.3 is a connection diagram of a synchronism control circuit embodying this invention.
FIG.4 shows a waveform to explain the operation of the circuit shown in FIG.3.

FIG.3 shows a block diagram of one example of a synchronism control circuit embodying this invention and comprising an input terminal 1 which receives a sampled waveform $V(t)$, a differentiating circuit 2, an amplifier 18 constituting an essential element of this invention, diodes 4, 5 and 6, a field effect transistor 10, transistors 11 and 14, resistors 7, 12, 13 and 15, condensers 3 and 9, an output terminal 16 and a circuit 17 which resets when the output voltage reaches a maximum value. The output wave form from the circuit shown in FIG.3 is shown in FIG.4.

In FIG.3 the sampled signal input ($Vt$) supplied to input terminal 1 is differentiated by the differentiating circuit 2 to provide $Y$ which is supplied to condenser 3 through amplifier 18. The amplifier 18 is of a variable amplification factor type which varies its amplification factor in inverse proportion to the value of | Y |. The circuit following this amplifier is a type of stepped wave generating circuit in which diodes 4 and 5 operate to supply only the negative pulse to gate electrode G of the field effect transistor 10 constituting a source follower. The negative pulse that has passed through the source follower 10 is derived from source electrode S of field effect transistor 10 and is then applied to the base electrode of transistor 11 which operates to amplify the negative pulse to increase the collector voltage of transistor 11. This voltage variation is fed back to gate electrode G of field effect transistor 10 through condenser 9. In this manner, as the negative pulses are successively supplied to condenser 3, the collector voltage of transistor 11 increases gradually and this voltage is taken out through an emitter output electrode 16 of transistor 14 which constitutes an emitter follower. The voltage variation at this time is shown by a portion 21 of a curve shown in FIG.4, the detail thereof being amplified as shown by an enlarged view 30 in FIG.4. The output from output terminal 16 of FIG.3 is supplied to a variable element of the synchronizing circuit to shift X in FIG.2. In the above described series of operations, if it is assumed that the amplification factor of amplifier 18 is constant as X approaches Xo the value of | Y | will be decreased so that it takes much time to increase the output voltage appearing at output terminal 16. However, in accordance with this invention as the amplifier 18 has a variable amplification factor which varies in inverse proportion to the value of | Y |, even when the value of | Y | decreases X is shifted rapidly so that when X reaches a point equal to or very close to Xo, the value of | Y | will be at or very close to | Y|min. Accordingly, the amplitude of the pulse that has been applied to condenser 3 shown in FIG.3 will be very small. Since a suitable value of voltage 8 is being supplied to gate electrode G of field effect transistor 10 through resistor 7, the increase in the output voltage caused by a pulse of a very small value and the voltage supplied by voltage 8 of a proper value through resistor 7 operates to decrease the output voltage and balance each other to maintain a constant voltage as shown by a portion 22 of the curve shown in FIG.4, this portion being shown by an enlarged view 32.

Upon occurrence of loss of synchronism due to variations in certain conditions | Y | increases rapidly to increase the output voltage to assume a condition as shown by a portion 23 of the curve shown in FIG.4. When the output voltage reaches a definite level 28, the reset circuit 17 shown in FIG.3 operates to render conductive diode 6 to restore the output voltage to level 27. After elapse of a period 20 in which diode 6 has been conductive, this diode 6 becomes nonconductive and the voltage again begins to increase as shown by a portion 24 of the curve shown in FIG.4, whereby a point of synchronism is rapidly reached. Upon reaching synchronism, a condition represented by a portion 25 will be maintained. Although as the value of X approaches Xo, | Y | decreases, since the amplification factor of amplifier 18 increases as the value of | Y | decreases it is possible to rapidly attain synchronism. Also when the voltage $V(t)$ supplied to input terminal 1 is small and hence | Y | is also small, synchronism can be rapidly attained because the amplification factor of amplifier 18 increases. The variable characteristics of the amplifier utilized in this embodiment can be provided in the following manner. Thus, the output from differentiating circuit 2 is converted into a direct current by full wave rectification and this direct current component is utilized as the bias voltage for the amplifier 18. With this connection, the bias voltage increases with the value of | Y | whereby the amplification factor is decreased.

In this invention, where the voltage $V(t)$ supplied to input terminal 1 is sufficiently large, amplifier 18 may be replaced by an attenuator 18' as shown in FIG. 3' of variable degree of attenuation. More particularly, it may be of a type which manifests a large attenuation when the input signal is large whereas a small attenuation when the input signal is small so the attenuation A may be said to be proportional to the amplitude of the signal $V(t)$.

Figure 5:
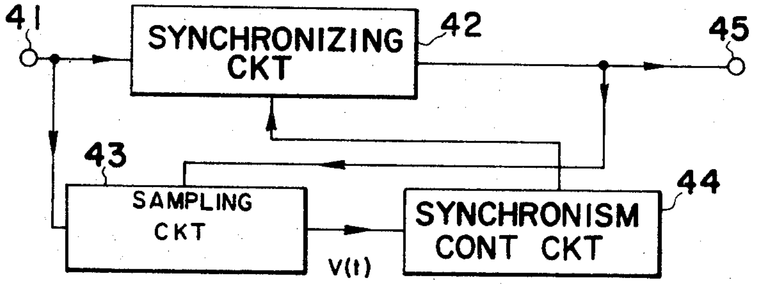
FIG.5 is a block diagram of a synchronizing system embodying this invention.

FIG.5 shows a block diagram of an automatic synchronizing system utilizing the synchronism control circuit shown in FIG.3. The system shown in FIG.5 includes an input terminal 41 for the synchronizing signal and a synchronizing circuit 42. A sampling circuit 43 is provided to receive the output from the synchronizing circuit 42 and said synchronizing signal input so as to apply sampled and maintained waveform $V(t)$ which is obtained by sampling said synchronizing signal input on terminal 41 to a synchronism control circuit 44 constructed as above described with reference to FIG.3. The output from circuit 44 is supplied to the synchronizing circuit 42 to control a variable element (not shown) included therein in a manner to vary the output until synchronism is achieved. The synchronizing output pulse is sent out through a terminal 45. Instead of directly connecting circuit 43 to terminal 41 it may be connected to receive a signal which is in synchronism with the synchronizing pulse.

Figure 6A:
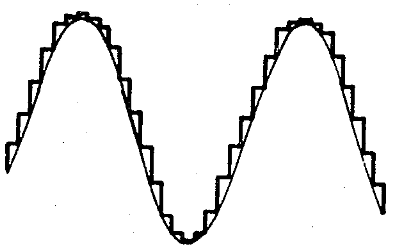
FIGS. 6*a* and 6*b* show waveforms sampled by a sampling oscilloscope.
Figure 6B:
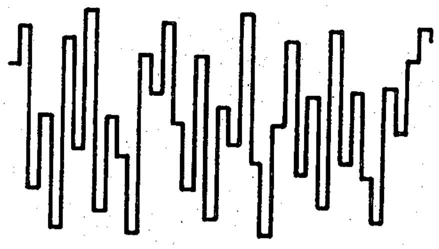

While in the foregoing embodiment the invention has been described as being applied to an oscilloscope and the like wherein the input waveform is sampled on the same level, it is to be understood that the invention is not limited to this particular application but may be equally applied to other sampling devices such as a sampling oscilloscope and the like. The waveform sampled by a sampling oscilloscope manifests a stepped waveform as shown in FIG.6*a* where the input wave has a sine waveform and where the sampling is effected in synchronism. However, where the sampling is effected asynchronously, the sampled wave manifests a waveform as shown in FIG.6*b*.

Figure 7:
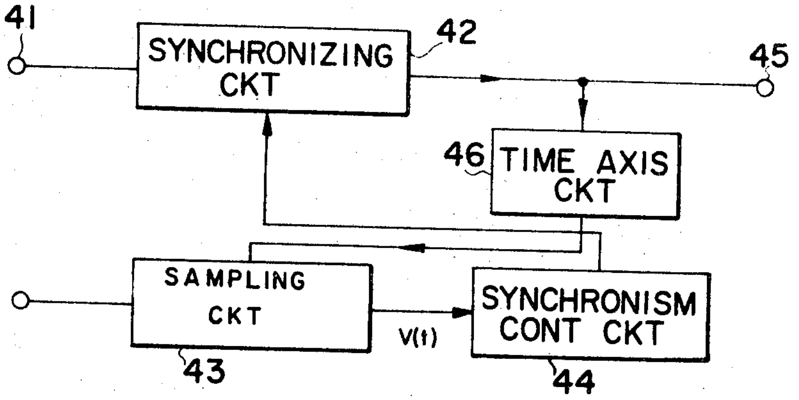
FIG.7 shows a block diagram of a sampling device of a sampling oscilloscope.

FIG.7 shows a block diagram of a sampling device which is identical to that shown in FIG.5 except that a time axis circuit 46 has been added. Since the invention comtemplates to control the synchronism control circuit 43, it will be clear that the invention can also be applied to sampling devices such as an oscilloscope without requiring any modification.

Thus, according to this invention, when the value of $Y$ is decreased or when the value of $Y$ is decreased owing to the decrease in the value of $V(t)$ the amplification factor of an amplifier is increased or the degree of attenuation of an attenuator is decreased to rapidly find the point of synchronism so as to automatically vary a variable element in a synchronizing circuit whereby an extremely stable synchronizing circuit can be provided. Accordingly, the invention can be advantageously applied to apparatus requiring synchronizing signals such as an oscilloscope, a pulse generator and the like.

While the invention has been shown and described in terms of preferred embodiments thereof many changes and modifications will be obvious to one skilled in the art without departing from the scope of the invention.

What is claimed is

1. In a method of synchronizing an input signal applied to a triggering circuit with the output signal delivered from said triggering circuit including the steps of providing an adjustable triggering circuit operable to receive an input signal and deliver therefrom an output signal; applying an input signal representative of a triggering input signal to said triggering circuit; sampling and holding a portion of said input signal applied to said triggering circuit to derive a sampled signal; differentiating said sampled signal to obtain a differentiated signal; and varying a variable component of said differentiated signal until the amplitude of said differentiated signal approaches a minimum value thereby obtaining a controlled differentiated signal wherein the improvement comprises: applying said controlled differentiated signal to have modified amplitude that varies inversely with the absolute value of said controlled differentiated signal and as so modified is applied to said triggering circuit to effect synchronization of the trigger circuit output signal with said input signal.

2. A method according to claim 1, wherein said varying step comprises generating a staircase waveform, and applying said differentiated signal to said staircase waveform to obtain said controlled differentiated signal.

3. In an improved triggering method for controlling a trigger circuit including the steps of providing a sample and hold circuit for sampling and holding a trigger input signal or a signal synchronized with said trigger input signal; differentiating an output of said sample and hold circuit; providing a synchronization control circuit for controlling a value of a variable element included with said trigger circuit; ceasing control of said value of said variable element when the amplitude of said differentiation circuit reaches a minimum value or a value adjacent to said minimum value; and maintaining said value of said variable in controlled condition; thereby automatically obtaining a synchronized condition; wherein the improvement comprises applying the differentiated output of said sample and hold circuit in said synchronization control circuit with the amplitude varied in accordance with the inverse of absolute value of the differentiated output signal to maintain said value of said variable in said controlled condition.

4. An improved triggering method according to claim 3, said synchronization control circuit being a staircase generating circuit applying the amplitude modified output of said differentiation circuit thereto and controlling said value of said variable of said synchronizing circuit by applying an output signal of said staircase generating circuit to said trigger circuit.

* * * * *

UNITED STATES PATENT OFFICE
CERTIFICATE OF CORRECTION

Patent No. 3,742,372 Dated June 26, 1973

Inventor(s) Kozo Uchida, Naohisa Nakaya and Koji Suzuki

It is certified that error appears in the above-identified patent and that said Letters Patent are hereby corrected as shown below:

Column 2, line 64, delete "09" at the beginning of the line.

Column 3, line 5, delete "09" at the beginning of the line.

Signed and sealed this 6th day of August 1974.

(SEAL)
Attest:

McCOY M. GIBSON, JR.
Attesting Officer

C. MARSHALL DANN
Commissioner of Patents